(12) United States Patent
Spence

(10) Patent No.: US 6,354,723 B1
(45) Date of Patent: Mar. 12, 2002

(54) LIGHTED FOOTREST FOR MOTORCYCLE

(76) Inventor: Wendell Lee Spence, P.O. Box 1034, East Jordan, MI (US) 49727

( * ) Notice: Subject to any disclaimer, the term of this patent is extended or adjusted under 35 U.S.C. 154(b) by 0 days.

(21) Appl. No.: 09/469,793

(22) Filed: Dec. 22, 1999

(51) Int. Cl.$^7$ ................................. B60Q 1/26
(52) U.S. Cl. ................. 362/540; 362/473; 362/523; 280/291; 280/164.1
(58) Field of Search ................. 362/473, 495, 362/474, 475, 476, 523, 540; 280/288.4, 291, 293, 763.1, 163, 164.1, 165, 166, 169; 180/90.6

(56) References Cited

U.S. PATENT DOCUMENTS

| | | | | |
|---|---|---|---|---|
| 2,185,600 A | * | 1/1940 | McComb | 362/473 |
| 2,334,442 A | * | 11/1943 | Salimbene | 362/473 |
| 2,561,756 A | * | 7/1951 | Shook | 362/495 |
| 2,732,541 A | * | 1/1956 | MacMahon | 362/473 |
| 3,764,976 A | * | 10/1973 | MacMahon | 340/87 |
| 4,797,791 A | * | 1/1989 | Burchick | 362/473 |
| RE34,275 E | * | 6/1993 | Ramsey | 362/495 |
| 5,454,580 A | * | 10/1995 | Lin | 280/291 |
| 5,702,172 A | * | 12/1997 | Kilburn | 360/473 |
| 5,902,038 A | * | 5/1999 | Curry | 362/473 |
| 5,915,830 A | * | 6/1999 | Dickson et al. | 362/495 |

* cited by examiner

Primary Examiner—Sandra O'Shea
Assistant Examiner—Ismael Negron

(57) ABSTRACT

A footrest for a motorcycle, such footrest having a hollow body containing a light source. A lens extends substantially over the entire surface of an opening of the housing for providing high visibility to oncoming traffic. A lens cover protects the lens from impact.

19 Claims, 2 Drawing Sheets

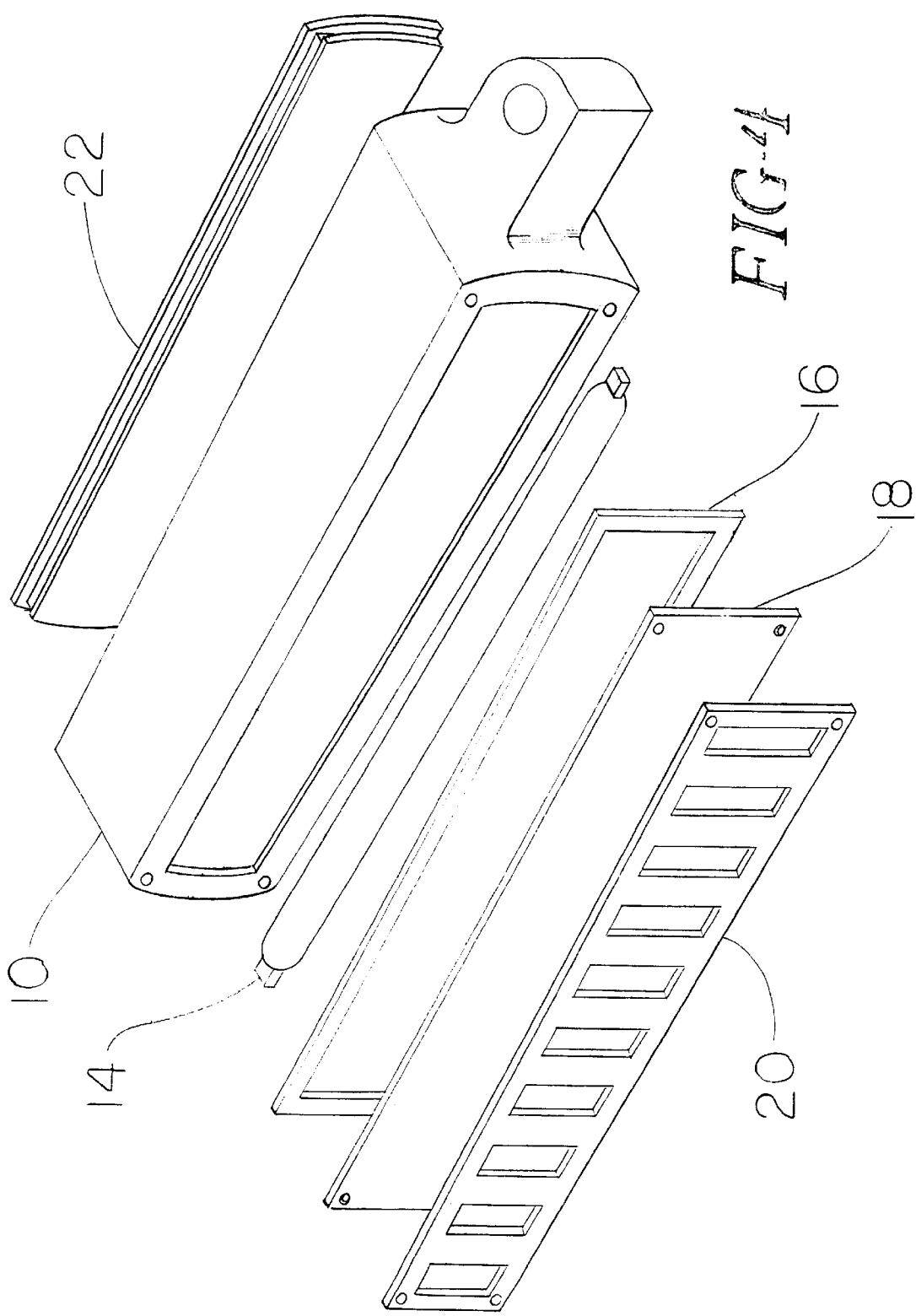

LIGHTED FOOTREST FOR MOTORCYCLE

BACKGROUND OF THE INVENTION

Applicant is aware of U.S. Pat. No. 4,797,791, a footrest with a small light on the outer bottom edge used for side clearance for other cycles.

When applicant applied for patent the prior art varied in shapes and styles. Some had reflectors that could be seen when reflecting other light sources. Another style had a small light for to identify the clearance between two motorcycles driving side by side. Originally, footrests were made for riders and passengers to rest their feet while riding. Applicant's invention does that and more. It provides an accessory light built-in, with a large lens substantially covering the bottom side, giving a light source day or night. This invention's light source is comprehensive and durable, protected in the base (10) by gasket (16), lens (18) and lens cover (20), thus helping identify the motorcycle.

BRIEF SUMMARY OF THE INVENTION

This invention is an improved footrest for motorcycles, combining a footrest and an accessory light. A light is built into the footrest with a lens the length of the footrest.

The footrest can be attached, with existing clamps now on the market, to the frame of the motorcycle in the following three positions:

1. Attached in rider's normal footrest position with light facing down.
2. Attached to the same part of the frame but higher and more towards the front to suit the rider, with light facing out forward. This is commonly known as the "highway position".
3. Attached as passenger footrest-attached to motorcycle in passenger peg position with light facing down. When retracted provides side light.

BRIEF DESCRIPTION OF THE SEVERAL VIEWS OF THE DRAWING

FIG. 4 is an exploded view showing the claimed invention. Components.

DETAILED DESCRIPTION OF THE INVENTION

Figure 1:
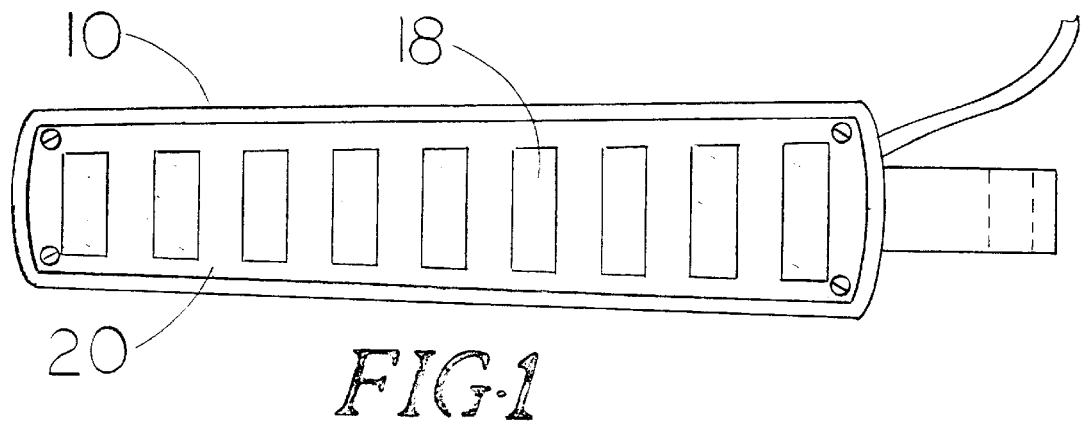
FIG. 1 is a front view of the claimed invention.
Figure 2:
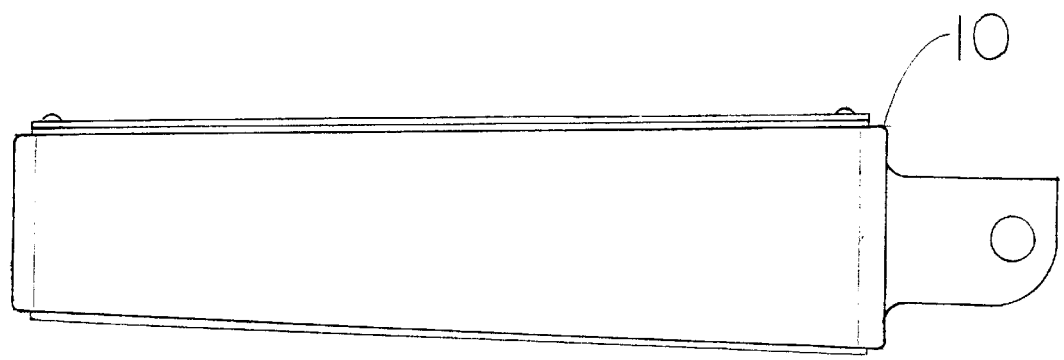
FIG. 2 is a side view of the claimed invention.
Figure 3:
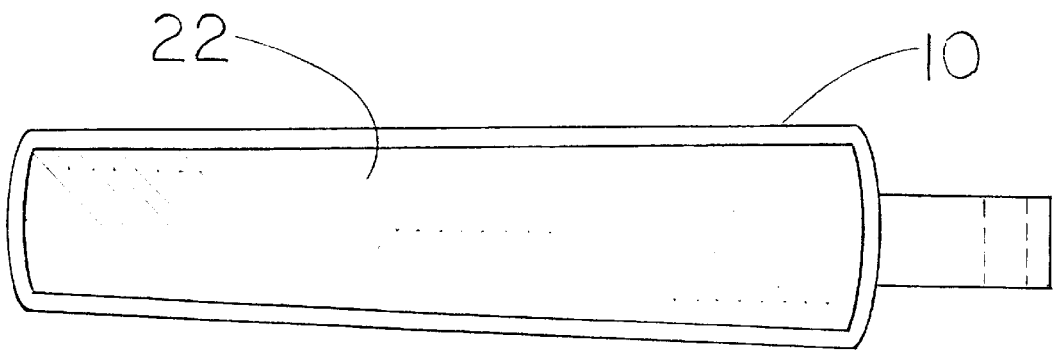
FIG. 3 is a back view of the claimed invention.

The footrest of the instant invention attaches with a standard mounting bracket on motorcycle and is manufactured the same as standard footrest so the protruding end will fit a standard mounting bracket.

The footrest has a hollow metal base 10 having a top wall, a pair opposed sidewalls, a front wall, a back wall and a bottom wall. Base 10 further includes an elongated pocket on top wall where an anti-skid insert is to be positioned, preferably made of a rubber material, to prevent a rider's foot from slipping off the footrest. Anti-skid insert 22 is glued into the pocket on the top wall of base 10.

The hollow base 10 contains inner electrical components for a light source, preferably a light bulb. The bottom wall includes a bottom opening for accessing the hollow base 10 inner space. Over the bottom wall periphery a gasket 16 is located, trapped between the base 10 and a lens 18 with a decorative lens cover 20. The lens 18 and decorative lens cover 20 are fastened to the base 10 by at least two threaded fasteners (preferably four). The lens 18 extends substantially over the whole area of the bottom wall, covering the bottom wall opening. The lens cover 20 protects the lens from impact. Base 10 and lens cover 20 are preferably chrome plated. The footrest is attached to the motorcycle frame using existing clamps now on the market. The lens, covering substantially the entire surface of the bottom wall, provides increased light output to better identify the motorcycle as such to oncoming traffic.

FIG. 1 shows the footrest of the claimed invention mounted to the frame on the front end of a motorcycle protruding out on each side in the highway footrest position with lights facing forward.

WHEREAS a preferred embodiment of the invention has been illustrated and described in detail, it wilt be apparent that various changes may be made in the disclosed embodiment, without departing from the spirit of the invention.

I claim:

1. An illuminated vehicle footrest comprising:
   a hollow generally rectangular base having a front wall, a back wall, two side walls, a top wall and a bottom wall having a bottom opening, said bottom opening giving access to the interior of said hollow base;
   means for attaching said base to the vehicle, said mean for attaching being located at one side wall;
   the top wall having a recess for receiving an anti-skid insert;
   a light source located within said hollow base interior;
   the periphery of the bottom opening having a pocket for receiving a gasket;
   the periphery of the bottom opening also having at least two threaded holes for receiving at least two screws;
   a lens and a lens cover of substantially the same shape as said bottom opening periphery; and
   said lens and lens cover having at least two through holes for receiving the at least two screws, such that said lens and lens cover are fastened to said bottom opening by threading the screws into the at least two threaded holes.

2. An illuminated vehicle footrest according to claim 1, wherein said anti-skid insert is a rubber insert.

3. An illuminated vehicle footrest according to claim 2, wherein said anti-skid insert is a rubber insert.

4. An illuminated vehicle footrest according to claim 1, wherein said lens and lens cover are large and substantially cover said bottom wall.

5. An illuminated vehicle footrest according to claim 4, wherein said anti-skid insert is a rubber insert.

6. An illuminated vehicle footrest according to claim 1, wherein said light source is a remote source fiber optic light source.

7. An illuminated vehicle footrest according to claim 6, wherein said lens and lens cover are large and substantially cover said bottom wall.

8. An illuminated vehicle footrest according to claim 7, wherein said anti-skid insert is a rubber insert.

9. An illuminated vehicle footrest according to claim 1, wherein said light source has a lamp bulb and a lamp socket.

10. An illuminated vehicle footrest according to claim 9, wherein said lens and lens cover are large and substantially cover said bottom wall.

11. An illuminated vehicle footrest according to claim 10, wherein said anti-skid insert is a rubber insert.

12. An illuminated vehicle footrest according to claim 1, wherein:
   said vehicle is a motorcycle;
   said means for attaching being for attachment to said motorcycle Standard Mounting Brackets.

13. An illuminated vehicle footrest according to claim 12, wherein said lens and lens cover are large and substantially cover said bottom wall.

14. An illuminated vehicle footrest according to claim 12, wherein said light source has a lamp bulb and a lamp socket.

15. An illuminated vehicle footrest according to claim 14, wherein said lens and lens cover are large and substantially cover said bottom wall.

16. An illuminated vehicle footrest according to claim 12, wherein said light source is a remote fiber optic light source.

17. An illuminated vehicle footrest according to claim 16, wherein said lens and lens cover are large and substantially cover said bottom wall.

18. An illuminated vehicle footrest comprising:
   a hollow generally rectangular base having a front wall, a back wall, two side walls, a top wall and a bottom wall having a bottom opening, said bottom opening giving access to the interior of said hollow base;
   means for attaching said base to the vehicle, said mean for attaching being located at one side wall;
   the top wall having a recess for receiving an anti-skid insert;
   a light source located within said hollow base interior;
   the periphery of the bottom opening having a pocket for receiving a gasket;
   the periphery of the bottom opening also having at least two threaded holes for receiving at least two screws;
   a lens and a lens cover of substantially the same shape as said bottom opening periphery;
   said lens and lens cover having at least two through holes for receiving the at least two screws, such that said lens and lens cover are fastened to said bottom opening by threading the screws into the at least two threaded holes;
   said vehicle is a motorcycle;
   said means for attaching being for attachment to said motorcycle Standard Mounting Brackets;
   said light source having a lamp bulb and a lamp socket;
   said lens and lens cover are large, and substantially cover said bottom wall; and
   said anti-skid insert being a rubber insert.

19. An illuminated vehicle footrest comprising:
   a hollow generally rectangular base having a front wall, a back wall, two side walls, a top wall and a bottom wall having a bottom opening, said bottom opening giving access to the interior of said hollow base;
   means for attaching said base to the vehicle, said mean for attaching being located at one side wall;
   the top wall having a recess for receiving an anti-skid insert;
   a light source located within said hollow base interior;
   the periphery of the bottom opening having a pocket for receiving a gasket;
   the periphery of the bottom opening also having at least two threaded holes for receiving at least two screws;
   a lens and a lens cover of substantially the same shape as said bottom opening periphery;
   said lens and lens cover having at least two through holes for receiving the at least two screws, such that said lens and lens cover are fastened to said bottom opening by threading the screws into the at least two threaded holes;
   said vehicle is a motorcycle;
   said means for attaching being for attachment to said motorcycle Standard Mounting Brackets;
   said light source is a remote source fiber optic light source;
   said lens and lens cover are large, and substantially cover said bottom wall; and
   said anti-skid insert being a rubber insert.

* * * * *